US011778321B2

(12) United States Patent
Yasutomi

(10) Patent No.: US 11,778,321 B2
(45) Date of Patent: Oct. 3, 2023

(54) IMAGE CAPTURING APPARATUS CAPABLE OF PERFORMING OMNIFOCAL PHOTOGRAPHING, METHOD OF CONTROLLING SAME, AND STORAGE MEDIUM

(71) Applicant: CANON KABUSHIKI KAISHA, Tokyo (JP)

(72) Inventor: Takeshi Yasutomi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 17/306,771

(22) Filed: May 3, 2021

(65) Prior Publication Data
US 2021/0352216 A1 Nov. 11, 2021

(30) Foreign Application Priority Data

May 11, 2020 (JP) ................. 2020-083399

(51) Int. Cl.
H04N 23/67 (2023.01)
H04N 23/63 (2023.01)
H04N 23/80 (2023.01)

(52) U.S. Cl.
CPC ........... H04N 23/676 (2023.01); H04N 23/63 (2023.01); H04N 23/80 (2023.01)

(58) Field of Classification Search
CPC ......... H04N 5/232133; H04N 5/23229; H04N 5/23293
See application file for complete search history.

(56) References Cited

U.S. PATENT DOCUMENTS 9,386,223 B2 * 7/2016 Matsumoto .......... H04N 23/698

FOREIGN PATENT DOCUMENTS

| JP | H10-290389 A | 10/1998 |
|----|--------------|---------|
| JP | 2003-244712 A | 8/2003 |
| JP | 4235729 B2 | 3/2009 |
| JP | 2015-222353 A | 12/2015 |

* cited by examiner

Primary Examiner — Twyler L Haskins
Assistant Examiner — Angel L Garces-Rivera
(74) Attorney, Agent, or Firm — CANON U.S.A., INC. IP Division

(57) ABSTRACT

An apparatus including an image capturing section for capturing an image of an object, a lens for causing the image of the object to be formed on an image sensor, and an operation section for acquiring photographing conditions including a focus movement amount and a number of images to be photographed from a user. The lens and the photographing unit are controlled to sequentially acquire the number of images to be photographed by discretely displacing a focal length by the acquired focus movement amount. Whenever an image to be photographed is acquired, a combining map indicative of a combining ratio of respective pixels at same positions in all of the acquired images is calculated, and a combined image is generated based on all of the acquired images according to the combining map and sequentially displayed by superimposing information on the combining map thereon.

20 Claims, 7 Drawing Sheets

FIG. 6
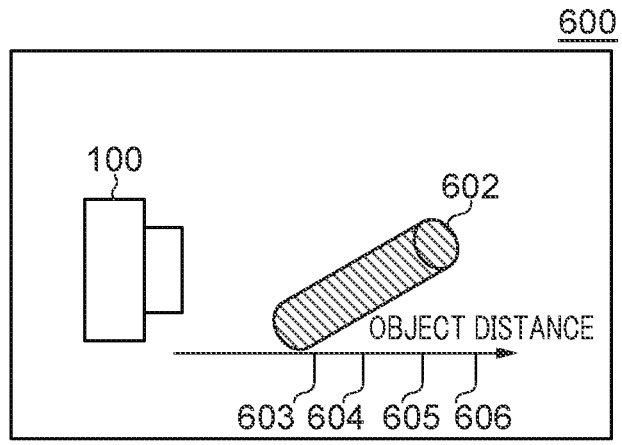
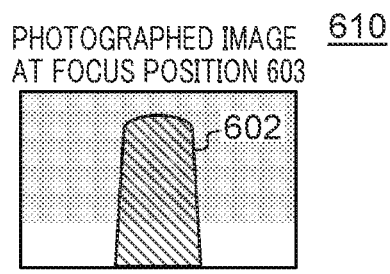
PHOTOGRAPHED IMAGE 610
AT FOCUS POSITION 603
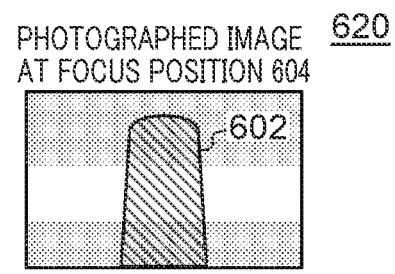
PHOTOGRAPHED IMAGE 620
AT FOCUS POSITION 604
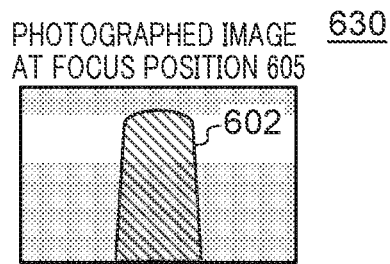
PHOTOGRAPHED IMAGE 630
AT FOCUS POSITION 605
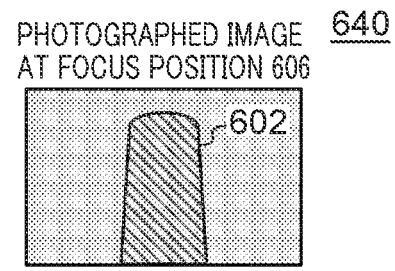
PHOTOGRAPHED IMAGE 640
AT FOCUS POSITION 606
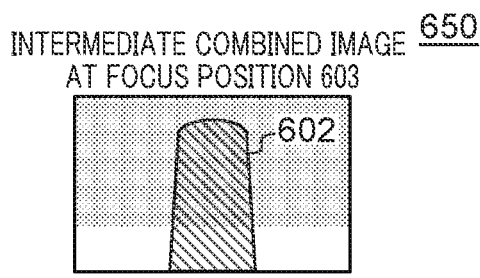
INTERMEDIATE COMBINED IMAGE 650
AT FOCUS POSITION 603
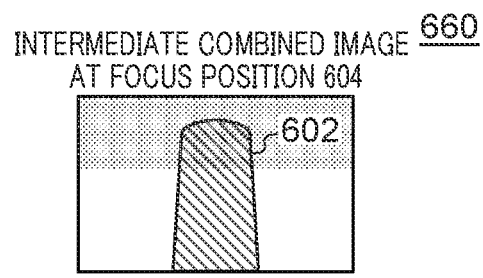
INTERMEDIATE COMBINED IMAGE 660
AT FOCUS POSITION 604
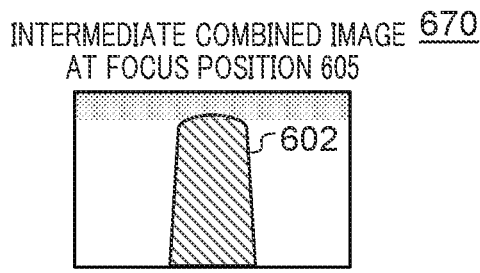
INTERMEDIATE COMBINED IMAGE 670
AT FOCUS POSITION 605
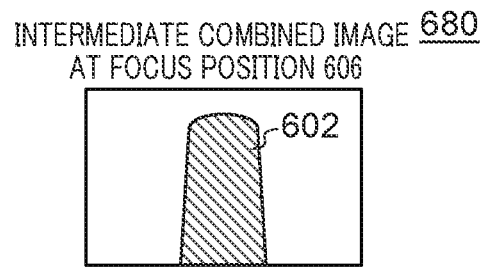
INTERMEDIATE COMBINED IMAGE 680
AT FOCUS POSITION 606

IMAGE CAPTURING APPARATUS CAPABLE OF PERFORMING OMNIFOCAL PHOTOGRAPHING, METHOD OF CONTROLLING SAME, AND STORAGE MEDIUM

BACKGROUND OF THE DISCLOSURE

Field of the Disclosure

The aspect of the embodiments relates to an image capturing apparatus capable of performing omnifocal photographing, a method of controlling the same, and a storage medium, and more particularly to an image capturing apparatus capable of performing omnifocal photographing by focus bracket photographing to generate an omnifocal image, a method of controlling the same, and a storage medium.

Description of the Related Art

Conventionally, there has been known an image capturing apparatus that performs omnifocal photographing. Omnifocal photographing refers to photographing for obtaining an image which is in focus over the whole photographed area by photographing a plurality of images while changing the in-focus position over the whole range of an object distance where an object can be brought into focus by the image capturing apparatus, extracting only an in-focus area from each image, and combining the extracted in-focus areas into one image. In omnifocal photographing, in general, the above-mentioned plurality of images are photographed by one photographing operation, for generation of an omnifocal image.

Japanese Laid-Open Patent Publication (Kokai) No. H10-290389 discloses a technique in which a plurality of images in the same photographing range, which are in focus at respective different image depths, are sequentially acquired by an image capturing apparatus, an image portion which is in focus is extracted from each of the acquired images, and an omnifocal image of the photographing range is generated by combining the extracted image portions.

Further, Japanese Laid-Open Patent Publication (Kokai) No. 2015-222353 proposes an image capturing apparatus that includes a position detection section for sequentially detecting a position of an object in a direction of a lens optical axis for a predetermined time period and is configured to determine a range of the depth of field based on the detected positions, perform photographing within the determined range, and combine the photographed images. This makes it possible to photograph an image which is in focus in a range intended by a user.

However, as disclosed in Japanese Laid-Open Patent Publication (Kokai) No. H10-290389, in a case where a plurality of images are sequentially photographed at different focus positions to generate an omnifocal image, a photographing range is set based on the method disclosed in Japanese Laid-Open Patent Publication (Kokai) No. 2015-222353. Specifically, a user is required to select a shift width of the focus position and images to be combined, and more specifically set settings, such as the number of images to be photographed by the image capturing apparatus and an aperture value to be applied when photographing is performed. Further, these settings have mutual influence on the image quality of an actually combined image, and hence it is required to set complicated settings in order to obtain a desired image quality. For this reason, if a photographer is experienced in handling a camera and familiar with details of image combining processing, the photographer can properly set settings based on the experience, but if the photographer is a beginner, it is difficult for him/her to properly set the settings.

If the photographed images are sequentially combined and the combined images are sequentially displayed on a display device, and an area where images are combined is displayed in a display form different from the photographed images during focus bracket photographing, this display can be used as a reference when a photographer sets the above-mentioned settings.

However, even when the progress of combining images is sequentially displayed as described above, in a case where there is little difference between the combined images which are sequentially displayed, it may be still difficult for a photographer to properly set the settings.

SUMMARY OF THE DISCLOSURE

In a first aspect of the embodiments, there is provided an apparatus including a photographing unit configured to capture an image of an object; a lens configured to cause the image of the object to be formed on an image sensor; at least one processor; and a memory coupled to the at least one processor, the memory having instructions that, when executed by the processor, perform the operations as:
- a setting acquisition unit configured to acquire photographing conditions including a focus movement amount and a number of images to be photographed, from a user; and
- an acquisition unit configured to control the lens and the photographing unit to sequentially acquire images to be photographed the number of which is the acquired number, by discretely displacing a focal length by the acquired focus movement amount,
- wherein whenever the acquisition unit acquires one of the acquired number of images to be photographed, the acquisition unit calculates a combining map indicative of a combining ratio of respective pixels at same positions in all of the acquired images, generates a combined image based on all of the acquired images according to the combining map, and sequentially displays the generated combined images by superimposing information on the combining map thereon.

In a second aspect of the embodiments, there is provided a method of controlling an apparatus including an image capturing section configured to capture an image of an object, a lens configured to cause the image of the object to be formed on an image sensor, and an operation section configured to acquire photographing conditions including a focus movement amount and a number of images to be photographed from a user, the method comprising:
- controlling the lens and the photographing unit to thereby sequentially acquire images to be photographed the number of which is the acquired number, by discretely displacing a focal length by the acquired focus movement amount; and
- calculating, whenever acquiring one of the acquired number of images to be photographed, a combining map indicative of a combining ratio of respective pixels at same positions in all of the acquired images, generating a combined image based on all of the acquired images according to the combining map, and sequentially displaying the generated combined images by superimposing information on the combining map thereon.

Further features of the present disclosure will become apparent from the following description of exemplary embodiments (with reference to the attached drawings).

BRIEF DESCRIPTION OF THE DRAWINGS

FIG. 6 is a diagram showing a case where images photographed at different focus positions are sequentially displayed on a display section appearing in FIG. 1 and a case where intermediate combined images at different focus positions are sequentially displayed on the display section.

DESCRIPTION OF THE EMBODIMENTS

The disclosure will now be described in detail below with reference to the accompanying drawings showing embodiments thereof.

Figure 1:
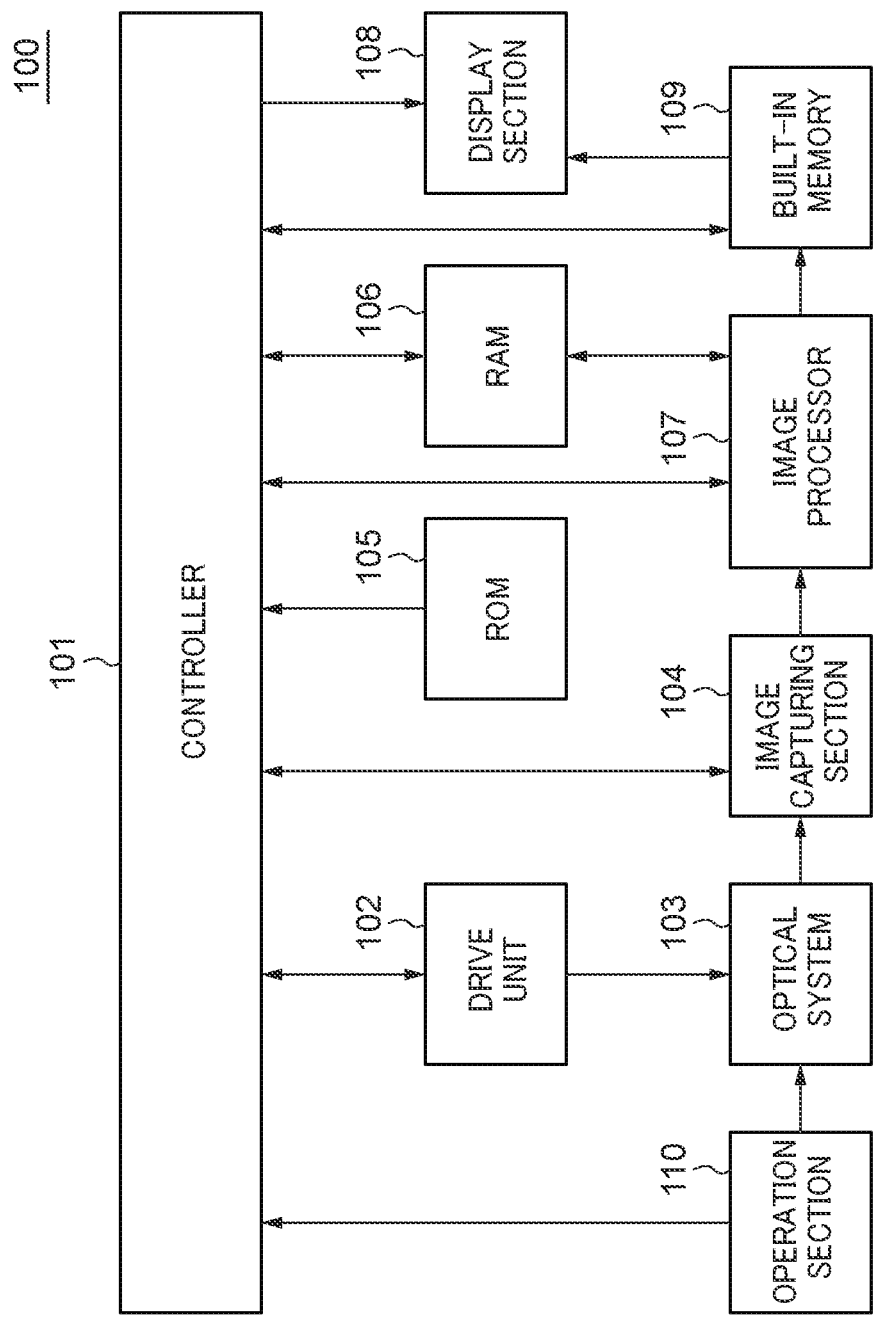
FIG. 1 is a block diagram showing a structure of a digital camera according to an embodiment of the disclosure.

FIG. 1 is a block diagram showing a structure of a digital camera as an image capturing apparatus according to the present embodiment.

The digital camera, denoted by reference numeral 100, is configured to be capable of capturing a still image, recording information on an in-focus position, calculating contrast values, and combining images. Further, the digital camera 100 is capable of performing enlargement or reduction processing on a stored captured image or an image input from the outside.

As shown in FIG. 1, the digital camera 100 includes a controller 101, a drive unit 102, an optical system 103, an image capturing section 104, a ROM 105, a RAM 106, an image processor 107, a display section 108, a built-in memory 109, and an operation section 110.

The controller 101 is a signal processor, such as a CPU or an MPU, and loads programs stored in the ROM 105 in advance into the RAM 106 to control the components of the digital camera 100. For example, the controller 101 delivers commands for starting and terminating image capturing to the image capturing section 104 in response to a user's operation performed on the operation section 110. Further, the controller 101 delivers an image processing command to the image processor 107 based on a program stored in the ROM 105.

The drive unit 102 is comprised of a motor and mechanically operates the optical system 103 under the control of the controller 101. For example, the drive unit 102 moves the position of a focus lens included in the optical system 103 to adjust a focal length of the optical system 103 according to a command from the controller 101.

The optical system 103 is comprised of a zoom lens, the focus lens, and a diaphragm. The diaphragm is a mechanism for adjusting the amount of light passing therethrough. The focus lens is a lens for causing an image of an object to be formed on the image capturing section 104 and the drive unit 102 changes the position of the focus lens to thereby change the in-focus position thereof.

The image capturing section 104 is an image sensor that is comprised of photoelectric conversion elements and performs photoelectric conversion to convert signals of incident light to electrical signals. For example, a CCD or a CMOS sensor can be applied to the image capturing section 104. For example, in a moving image capturing mode, the image capturing section 104 captures a plurality of temporally sequential images each as a frame of a moving image.

The ROM 105 is a read-only nonvolatile memory and stores not only operation programs for the blocks included in the digital camera 100, but also parameters for the operations of the blocks.

The RAM 106 is a rewritable volatile memory and is used as an area for temporarily storing data, such as data of an image, which is output by operation of associated blocks included in the digital camera 100.

The image processor 107 performs various image processing operations, such as white balance adjustment, color interpolation, and filtering, on image data output from the image capturing section 104 or image data stored in the built-in memory 109, described hereinafter. Further, the image processor 107 performs compression processing on image data output from the image capturing section 104 based on standards, such as JPEG.

Here, in the present embodiment, the image processor 107 is implemented by an integrated circuit (ASIC) formed by integrating circuits each for performing specific processing but is not limited to this. For example, the controller 101 may doubly perform part or all of functions of the image processor 107 by performing processing according to programs read out from the ROM 105. In a case where the controller 101 doubly performs all of functions of the image processor 107, the image processor 107 need not be provided as hardware.

The display section 108 is a touch panel formed by a display device, such as a liquid crystal display or an organic EL display, and a position input device, such as a touch pad. The display section 108 displays an image temporarily stored in the RAM 106, an image stored in the built-in memory 109, a setting screen of the digital camera 100, software keys, and so forth.

The built-in memory 109 stores an image captured by the image capturing section 104, an image processed by the image processor 107, information on the in-focus position for image capturing, and so forth. The digital camera 100 may store the images and information e.g. in a memory card instead of the built-in memory 109.

The operation section 110 is comprised of physical keys provided on the digital camera 100, such as buttons, switches including a shutter switch, keys, and a mode dial, and software keys displayed on the display section 108 which is the touch panel.

Next, omnifocal photographing performed by the digital camera 100 will be described. In the present embodiment, the digital camera 100 performs so-called focus bracket photographing when performing omnifocal photographing.

The controller 101 sets the mode of the digital camera 100 to a focus bracket photographing mode for an omnifocal image, in response to a predetermined user's operation performed on the operation section 110.

Then, the controller 101 instructs the display section 108 to display a screen for setting photographing conditions, such as a focus movement amount (hereinafter referred to as the defocus amount) and the number of images to be photographed. With this, the user sets the defocus amount and the number of images to be photographed in omnifocal photographing by operating the operation section 110 (setting acquisition unit) before instructing the start of omnifocal photographing by pressing the shutter switch. However, the controller 101 may set the defocus amount and the number of images to be photographed by analyzing a photographing status instead of receiving the above-mentioned user settings.

After that, when the user instructs the start of photographing by pressing the shutter switch, the controller 101 first sets the defocus amount and the number of images to be photographed, set in advance, as the photographing conditions, in response to this instruction. Further, the controller 101 sets other photographing conditions, more specifically, a focus position, an aperture value, and a shutter speed of the first image to be combined. In the present embodiment, the closest focus position is set as the focus position of the first image to be combined, and then the focus position is sequentially moved in an infinity direction. After setting the above-mentioned photographing conditions, the controller 101 photographs the first image to be combined and stores the obtained image to be combined in the built-in memory 109.

Then, the controller 101 sequentially photographs the set number of images to be combined while discretely displacing the focus position of the focus lens by the set defocus amount and sequentially stores the obtained images to be combined in the built-in memory 109, followed by completing the omnifocal photographing.

Next, generation of an omnifocal image by the digital camera 100 will be described.

The omnifocal image is generated by performing an image combining process on a plurality of images to be combined, which have been photographed by sequentially moving the focus position of the focus lens during omnifocal photographing. More specifically, the image processor 107 sequentially reads out the images to be combined from the built-in memory 109 in a photographed order, selects pixel values of an image portion which is highest in sharpness, i.e. an image portion in best focus, in each of the plurality of read images to be combined, and combines selected pixel values to generate a combined image. Thus, the image processor 107 generates an image which is high in sharpness anywhere within a screen, i.e. an omnifocal image, as a final image.

However, to obtain an excellent omnifocal image, settings for omnifocal photographing are properly set, such as a shift width of the focus position used when photographing a plurality of images to be combined, the number of images to be combined, and further, an aperture value to be applied when photographing is performed. Unless these settings are properly set, the omnifocal image can be made uneven in brightness or uneven in the sense of resolution. For example, the shift width of the focus lens is sometimes changed by an F-value to be applied when photographing is performed.

To prevent this, in the present embodiment, when images are combined to generate an omnifocal image, how the image combining process is progressing is displayed such that it can be clearly perceived, whereby a user is enabled to properly set the settings for omnifocal photographing and a timing to complete the omnifocal photographing.

Here, as the method of displaying the progress of image combining, a method of sequentially displaying a combined image generated in the middle of generation of an omnifocal image is envisaged. However, according to this method, there is a case where no pixel values of an image to be combined, which is most recently read from the built-in memory 109, are selected as the pixel values for the combined image, and as a result, there is no change in the combined image, which makes it difficult to perceive the progress of image combining.

To overcome this inconvenience, in the present embodiment, combined images generated in the middle of generation of an omnifocal image are sequentially displayed while superimposing a combining map, described hereinafter, thereon. Further, to enable a user to complete omnifocal photographing based on this display, the omnifocal image is generated by combining images on a real-time basis while photographing images to be combined by sequentially moving the focus position.

Figure 2:
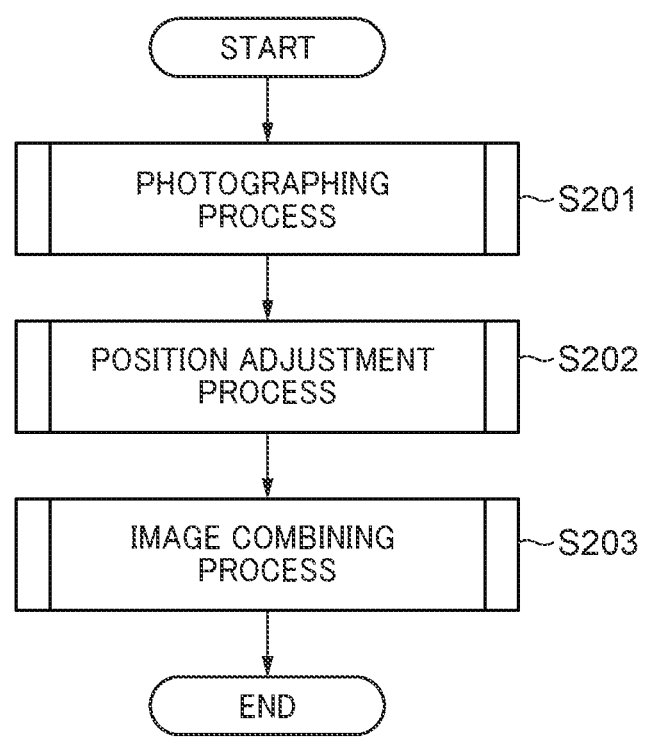
FIG. 2 is a flowchart of an omnifocal image generation process performed by the digital camera.

FIG. 2 is a flowchart of an omnifocal image generation process in the present embodiment.

The present process is executed by the controller 101 that loads a program stored in the ROM 105 into the RAM 106.

In a step S201, a photographing process is performed in which a number, set in advance, of images to be combined which are different in focus position, are captured by the image capturing section 104. Details of this process will be described hereinafter with reference to FIG. 3.

In a step S202, the controller 101 performs a position adjustment process on the plurality of images to be combined, which were captured by the image capturing section 104 in the step S201. Details of this process will be described hereinafter with reference to FIG. 4.

In a step S203, the images to be combined, which have been subjected to position adjustment, are combined by the image processor 107 to generate a combined image, followed by terminating the present process. Details of the step S203 will be described hereinafter with reference to FIG. 5.

Figure 3:
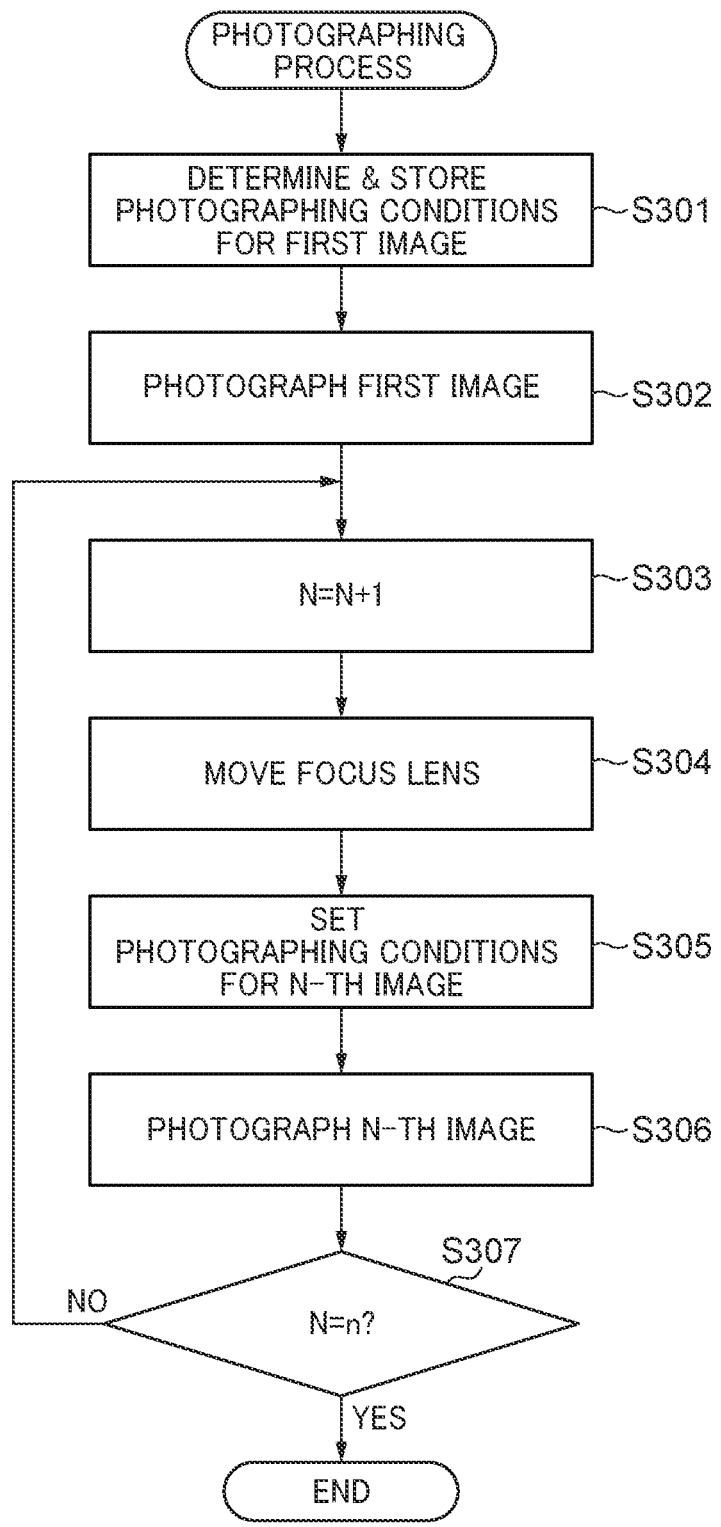
FIG. 3 is a flowchart of a photographing process in a step in FIG. 2.

FIG. 3 is a flowchart of the photographing process in the step S201 in FIG. 2.

The present process is started after the controller 101 moves the focus lens to a focus position of the first image to be combined, in response to a user's operation of pressing the shutter switch in the focus bracket photographing mode for an omnifocal image.

In a step S301, the photographing conditions for the first image to be combined are determined. In general, for example, a shutter speed, an ISO speed, an F value, and so forth, are determined based on a result of image capturing of a so-called live view image.

In a step S302, the first image to be combined is photographed as an operation of a series of photographing operations according to the photographing conditions set in the step S301 and is stored in the built-in memory 109.

In a step S303, after completion of photographing of the first image to be combined, a number N assigned to a photographed image is incremented by one. Note that the initial value of the number N assigned to a photographed image is 1.

In a step S304, the focus lens is moved by the defocus amount set in advance.

In a step S305, the photographing conditions for the next image to be combined are set. Here, although in the present embodiment, the photographing conditions for the next image to be combined are set to the same conditions as those for the image to be combined, which was immediately precedingly photographed, this is not limitative. For example, the photographing conditions may be changed according to the image combining process or a lens in use included in the optical system 103.

In a step S306, an N-th image is photographed as an operation of the series of photographing operations according to the photographing conditions set in the step S305 and is stored in the built-in memory 109.

In a step S307, after completion of photographing of the N-th image, the controller 101 determines whether or not the number N assigned to a photographed image has reached a designated number n, and if the number N assigned to a photographed image has not reached the designated number n, the process returns to the step S303, whereas if the number N assigned to a photographed image has reached the designated number n, the present process is terminated. Here, the designated number n refers to the number of images to be photographed, set by the user in advance.

Note that FIG. 2 shows as if after photographing all of the number n of images to be combined in the step S201, the process proceeded to the step S202, but, to be more precise, after the first image to be combined has been photographed and stored in the step S302, the position adjustment process in the step S202 is started. From then on, similarly, the position adjustment process in the step S202 is performed whenever the N-th image to be combined is photographed and stored in the step S306.

Figure 4:
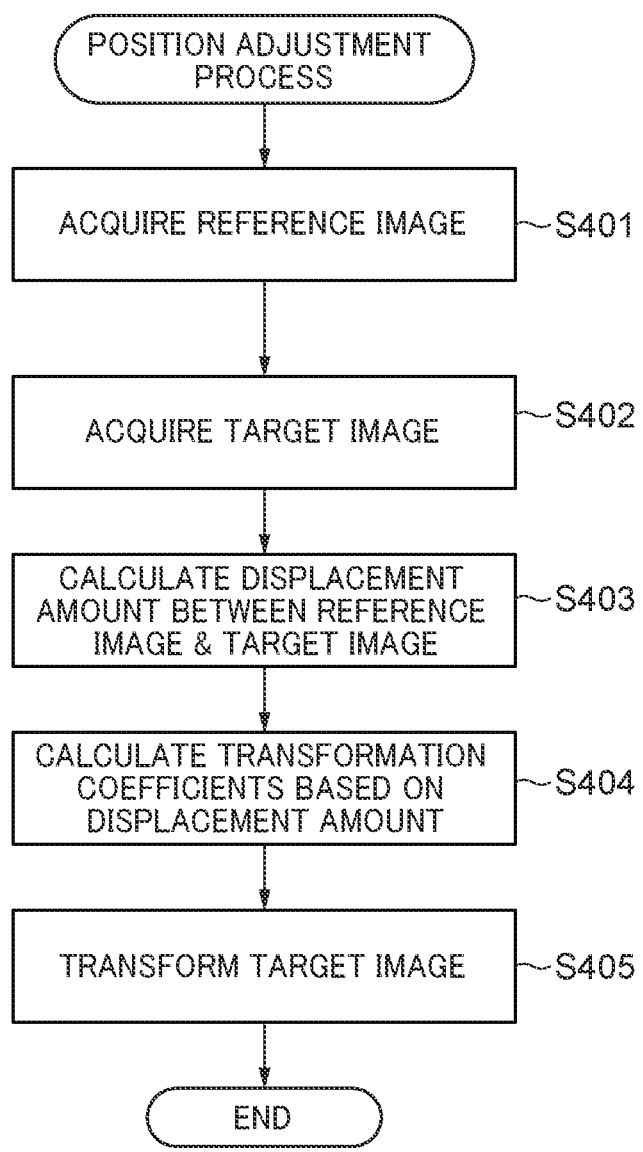
FIG. 4 is a flowchart of a position adjustment process in a step in FIG. 2.

FIG. 4 is a flowchart of the position adjustment process in the step S202 in FIG. 2.

In a step S401, the controller 101 acquires images to be combined, which were captured (photographed) by the image capturing section 104 in the step S201, from the built-in memory 109, and sets one of the acquired images as a reference image for position adjustment. Here, although in the present embodiment, an image which is earliest in the photographed order is selected as the reference image for position adjustment, this is not limitative. For example, the angle of view is slightly changed between photographed images by photographing while changing the focus position, and hence an image, which is narrowest in the angle of view, out of the images to be combined, which were captured (photographed) by the image capturing section 104 in the step S201, may be set as the reference image for position adjustment.

In a step S402, the controller 101 acquires the N-th image to be combined, which was captured by the image capturing section 104 in the step S201, from the built-in memory 109 and sets the acquired image as a target image. Note that in a case where only the first image to be combined was stored in the built-in memory 109, this image to be combined is set as the first combined image and stored in the built-in memory 109, followed by terminating the present process and the process in FIG. 2.

In a step S403, the controller 101 calculates a positional displacement amount between the reference image and the target image.

In the present embodiment, the displacement amount in the step S403 is calculated by a calculation method described below.

First, the controller 101 sets a plurality of blocks having the same size in the reference image.

Next, the controller 101 sets ranges, each of which is wider than each block of the reference image, in the target image at the same positions of the respective blocks of the reference image, as the search ranges.

Finally, the controller 101 calculates, for each search range in the target image, a corresponding point where the sum of absolute difference (hereinafter referred to as the SAD) in luminance between the search range and a corresponding block of the reference image is the smallest. The controller 101 calculates a vector extending from the center of the corresponding block of the reference image as a start point to the calculated corresponding point as an end point, as the positional displacement amount in the step S403.

Note that although in the present embodiment, the controller 101 calculates the corresponding point using the SAD, this is not limitative. For example, the sum of squared difference (hereinafter referred to as the SSD), normalized cross correlation (hereinafter referred to as the NCC), or the like, may be used in place of the SAD.

Referring again to FIG. 4, in a step S404, the controller 101 calculates transformation coefficients based on the positional displacement amount between the reference image and the target image. Although in the present embodiment, the controller 101 uses projection transformation coefficients as the transformation coefficients, this is not limitative. For example, affine transformation coefficients or simplified transformation coefficients having only horizontal and vertical shifts may be used in place of the projection transformation coefficients.

In a step S405, the image processor 107 performs transformation of the target image using the transformation coefficients calculated in the step S404 and stores the transformed image in the built-in memory 109, followed by terminating the present process.

For example, the controller 101 performs transformation by the following equation (1):

$$I' = \begin{pmatrix} x' \\ Y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad (1)$$

In the equation (1), (x', y') represents coordinates after transformation has been performed, and (x, y) represents coordinates before performing transformation. A matrix A represents the transformation coefficients calculated by the controller 101 in the step S404.

Note that FIG. 2 shows as if after subjecting all of the number n of images to be combined to the position adjustment process in the step S202, the process proceeded to the step S203, but, to be more precise, the image combining process in the step S203 is executed whenever the N-th image to be combined (target image) is transformed and stored in the step S405.

Figure 5:
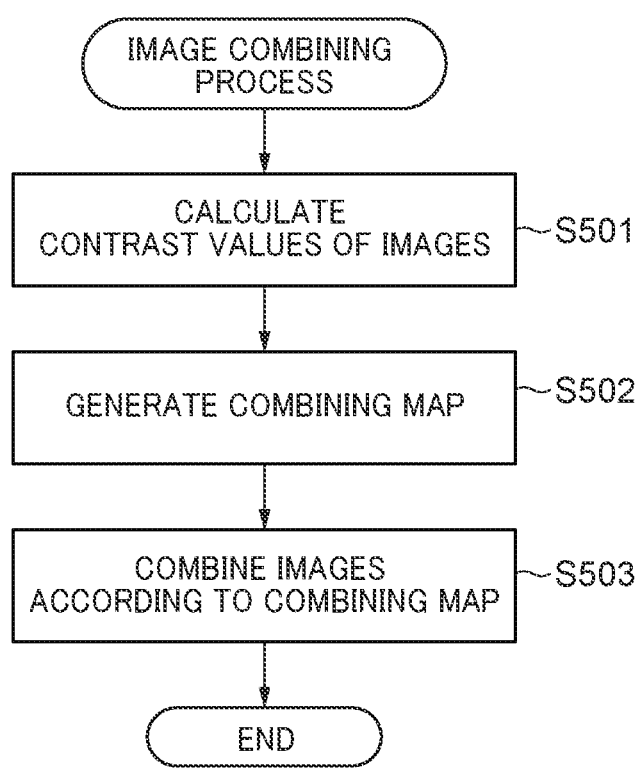
FIG. 5 is a flowchart of an image combining process in a step in FIG. 2.

FIG. 5 is a flowchart of the image combining process in the step S203 in FIG. 2.

In a step S501, the image processor 107 calculates contrast values of the reference image stored in the built-in memory 109 and all of the images transformed in the step S405. As an example of the contrast value calculation method, for example, the image processor 107 first calculates a luminance Y based on color signals Sr, Sg, and Sb of each pixel by the following equation (2):

$$Y = 0.299Sr + 0.587Sg + 0.114Sb \quad (2)$$

Next, a contrast value I is calculated by using a Sobel filter as expressed in in the following equations (3) to (5) for a matrix L of the luminance Y of 3×3 pixels.

$$I_h = \begin{pmatrix} -1 & 0 & 1 \\ -2 & 0 & 2 \\ -1 & 0 & 1 \end{pmatrix} \cdot L \quad (3)$$

$$I_v = \begin{pmatrix} -1 & -2 & -1 \\ 0 & 0 & 0 \\ 1 & 2 & 1 \end{pmatrix} \cdot L \quad (4)$$

$$I = \sqrt{I_h^2 + I_v^2} \qquad (5)$$

Note that the contrast value calculation method according to the present embodiment is described by way of example, and for example, an edge detection filter, such as a Laplacian filter, or a bandpass filter that passes a predetermined band, can be used in place of the Sobel filter.

In a step S502, the image processor 107 generates a combining map. In the present embodiment, the image processor 107 compares the contrast values of pixels at the same positions in the respective images set as the contrast value calculation targets in the step S501, with each other, and calculates a combining map indicating a combining ratio corresponding to the magnitude of the contrast value. Note that as is clear from an equation (6), this "combining ratio" is a ratio of a pixel value of a corresponding pixel of an m-th photographed image with respect to a pixel value of each pixel of a combined image generated by combining a number M of photographed images.

The specific calculation method is described as follows:

A combining map Am (x, y) is generated using the contrast value Cm (x, y) calculated in the step S501. Note that m represents an m-th image out of the plurality of images which are different in focus position and are set as the contrast value calculation targets in the step S501, x represents a horizontal coordinate of the image, and y represents a vertical coordinate of the same. The combining map is calculated by weighted average based on the contrast values obtained on a pixel-by-pixel basis. Assuming that a number M of images which are different in focus position have been captured, the combining map Am (x, y) for the m-th image is expressed by the equation (6).

$$A_m(x, y) = \frac{C_m(x, y)}{\sum_{k=1}^{M} C_k(x, y)} \qquad (6)$$

In a step S503, the image processor 107 generates a combined image according to the combining map generated in the step S502 and stores the generated image in the built-in memory 109, followed by terminating the present process.

With the above-described process, the digital camera 100 performs photographing while moving the focus position, and executes generation of an omnifocal image in parallel with this photographing operation.

Next, a description will be given of an issue generated in a case where the images to be combined, which are sequentially photographed in the step S201, are displayed on the display section 108 and an issue generated in a case where the combined images, sequentially generated in the step S203, are displayed on the display section 108 with reference to FIG. 6.

In a case where omnifocal photographing is performed, image capturing is performed by the digital camera 100 at a plurality of in-focus positions. In the present embodiment, in an environment 600, the focus lens of the digital camera 100 is moved to each of focus positions 603 to 606 from a minimum-object-distance side toward an infinite-distance side.

Photographed images 610 to 640 are first to fourth images to be combined, obtained in a case where the photographing process in FIG. 3 is performed in the environment 600.

Further, intermediate combined images 650 to 680 are combined images generated on a real-time basis whenever each of the photographed images 610 to 640 is stored in the built-in memory 109.

Referring to FIG. 6, each area in the photographed images 610 to 640, which is indicated by shading, shows an area which is out of focus. In a case where an object 602 is photographed by the digital camera 100 by setting the focus lens to the focus position 603, a lower portion of the object 602 is in focus as shown in the photographed image 610. After that, when the focus position is sequentially moved toward the infinite-distance side, as shown in the photographed images 620 and 630, the in-focus area sequentially changes from the lower side toward the upper side of the object 602 on the screen. Then, the focus lens reaches the focus position 606, and the photographed image 640 in which no area of the object 602 is in focus is photographed.

In a case where these photographed images 610 to 640 are sequentially displayed on the display section 108 during omnifocal photographing, the user can only confirm an in-focus portion of each image obtained by photographing, and it is difficult for the user to imagine a combined image sequentially generated in the step S503.

To cope with this, in the present embodiment, the intermediate combined images 650 to 680 are generated on a real-time basis when each of the photographed images 610 to 640 is photographed and are each displayed on the display section 108 before the next photographing timing.

In a case where the intermediate combined images 650 to 680 are sequentially displayed on the display section 108 during omnifocal photographing as described above, the user can confirm that the range in which the object 602 is in focus is increased from the lower side of the image in accordance with the progress of the photographing. Therefore, in this case, the progress of the image combining process can be more easily known than in a case where the photographed images 610 to 640 are sequentially displayed on the display section 108.

However, for example, in a case where the background of the object 602 is at an infinity distance, an area other than the object 602 has little difference between the intermediate combined image 670 at the focus position 605 and the intermediate combined image 680 at the focus position 606, and hence it is difficult to discriminate between details of the image combining process.

Figure 7:
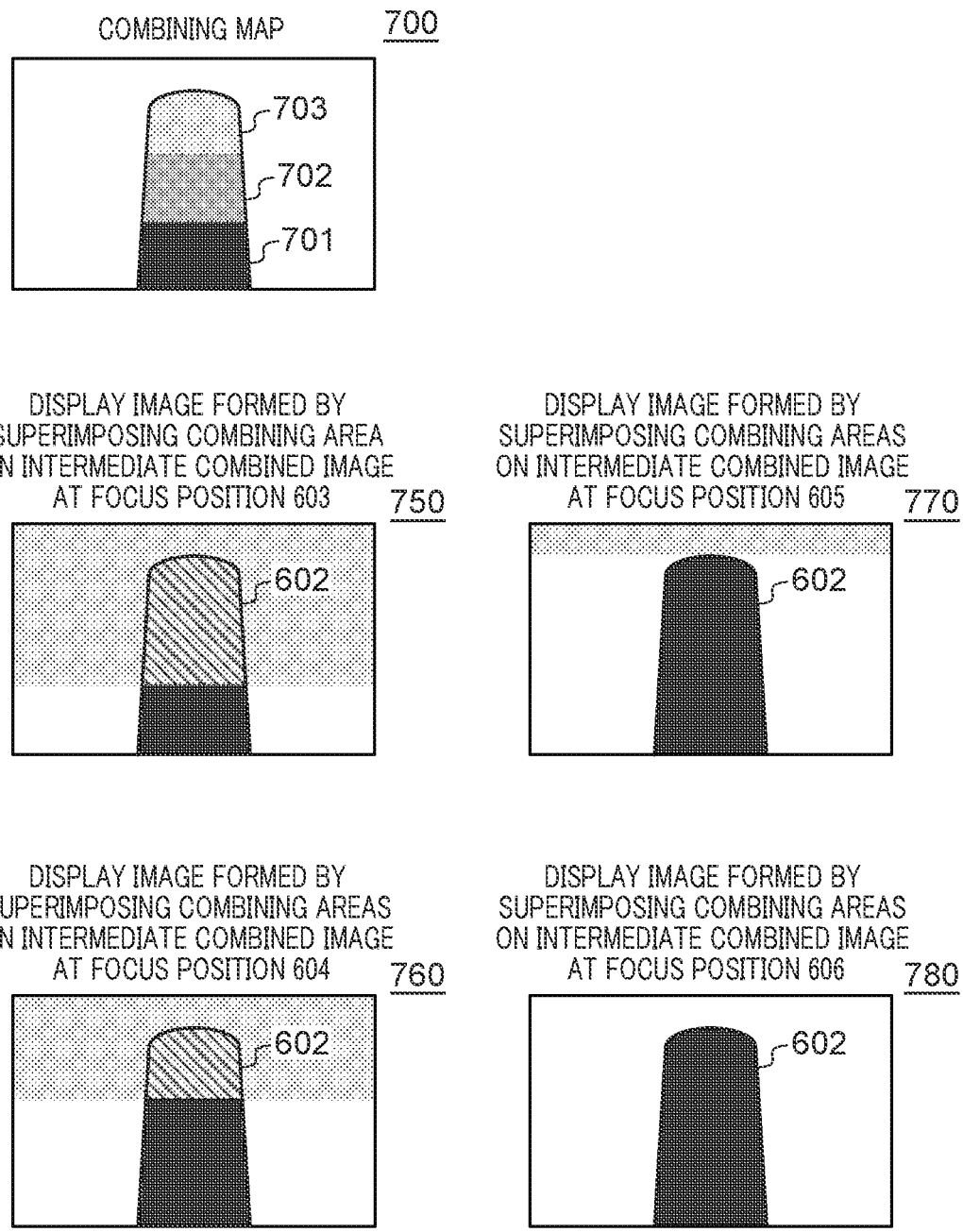
FIG. 7 is a diagram showing a case where, when sequentially displaying the intermediate combined images at different focus positions on the display section, combining areas of the intermediate combined images, indicated by a combining map, are superimposed thereon.

To cope with this, in the present embodiment, as shown in FIG. 7, the combining map generated in the step S502 is made use of to make it possible to discriminate between details of the image combining process.

FIG. 7 is a diagram showing a case where when the intermediate combined images 650 to 680 at the different focus positions 603 to 606 are sequentially displayed on the display section 108, combining areas of the intermediate combined images 650 to 680, indicated by a combining map, are superimposed thereon. Note that the image showing an image of the combining area to be superimposed may be an image which enables a user to discriminate the combining area from the other area and recognize that the combining area is superimposed. For example, this image may be generated by adding a specific color or a higher luminance to each pixel within the combining area. Thus, the image distinguished from the other area which is not a combining area is superimposed on the combined image, whereby part where image combining is completed is clearly indicated.

A combining map 700 of the omnifocal image includes combining areas 701 to 703.

The combining area 701 is an in-focus area in the photographed image 610, which indicates an area combined from the photographed image 610 (first photographed image to be combined) photographed at the focus position 603.

The combining area 702 is an in-focus area in the photographed image 620, which indicates an area combined from the photographed image 620 (second photographed image to be combined) photographed at the focus position 604.

The combining area 703 is an in-focus area in the photographed image 630, which indicates an area combined from the photographed image 630 (third photographed image to be combined) photographed at the focus position 605.

Note that the photographed image 640 photographed at the focus position 606 (fourth photographed image to be combined) has no in-focus area with respect to the object 602, as shown in the environment 600 in FIG. 6, and hence no area in the photographed image 640 appears in the combining map 700.

As indicated by superimposed display images 750 to 780, the combining areas 701 to 703 are sequentially superimposed and displayed on the intermediate combined images 650 to 680 generated in synchronism with the photographing progress timing.

As described above, in the present embodiment, the superimposed display images 750 to 780 are sequentially displayed on the display section 108. With this, the user can easily know which area(s) of the object 602 displayed on the display section 108 has (have) already become the omnifocal image.

Further, although in the present embodiment, the contrast values obtained from the photographed images to be combined are acquired (step S501), and the combining map is generated based on the contrast values, the combining map can be generated by another method. For example, the combining map may be generated by detecting an in-focus area within an image based on a distance to an object, which is detected using a sensor (distance acquisition unit) arranged on the image sensor by a pupil division method, whenever the focus lens is moved (see e.g. Japanese Laid-Open Patent Publication (Kokai) No. 2003-244712). Further, the combining map may be generated by using a technique, such as a ToF (Time of Flight) sensor (see e.g. Japanese Patent No. 4235729). In short, the point of the aspect of the embodiments is to sequentially display the combining areas indicated by the combining map by sequentially superimposing each of them on the intermediate combined images, and is not limited to the combining map generation method.

Further, although in the present embodiment, the description is given assuming that an omnifocal image is generated by photographing the object 602 four times while displacing the focus point (focus position), and combining the obtained four images to be combined, this is not limitative. For example, the object 602 may be photographed more number of times while displacing the focus point (focus position) and an omnifocal image may be generated from a plurality of obtained images. However, in this case, the combining areas indicated by the combining map generated in the step S502 sometimes overlap between images to be combined, whose focus positions are adjacent to each other. Therefore, the number of times of having been selected as a combining area of pixels of an image to be combined and a change in the number of times between intermediate combined images are recorded. Then, a different color is added to each pixel depending on whether or not the recorded number of times is not smaller than a predetermined value or depending on whether or not there is a change in the recorded number of times. With this, the user can more reliably know whether or not all areas of the object 602 displayed on the display section 108 have become an omnifocal image.

As described above, according to the present embodiment, the user can easily set settings associated with omnifocal photographing, such as the proper number of images to be photographed and an aperture value at which a desired image quality can be obtained, based on changes in the combining areas in the superimposed display image. As a result, it is possible to efficiently obtain an omnifocal image having a desired image quality.

Note that although in the present embodiment, the description is given of the digital camera 100 by way of example, the same method can also be applied to a mobile phone equipped with a camera, such as a smartphone. Further, in a case where the photographing process in the step S201 is executed by an external apparatus, the same method can also be applied to an information terminal, such as a PC.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-083399 filed May 11, 2020, which is hereby incorporated by reference herein in its entirety.

What is claimed is:
1. An apparatus comprising:
a photographing unit configured to capture an image of an object;

a lens configured to cause the image of the object to be formed on an image sensor;

at least one processor; and a memory coupled to the at least one processor, the memory having instructions that, when executed by the processor, perform the operations as:

a setting acquisition unit configured to acquire photographing conditions including a focus movement amount and a number of images to be photographed, from a user; and an acquisition unit configured to control the lens and the photographing unit to sequentially acquire images to be photographed the number of which is the acquired number, by discretely displacing a focal length by the acquired focus movement amount, wherein whenever the acquisition unit acquires one of the acquired number of images to be photographed, the acquisition unit calculates a combining map indicative of a combining ratio of respective pixels at same positions in all of the acquired images, generates a combined image based on all of the acquired images according to the combining map, and sequentially displays the generated combined images by superimposing information on the combining map thereon.

2. The apparatus according to claim 1, wherein the combining map is calculated based on contrast values of all acquired images whenever the acquisition unit acquires an image.

3. The apparatus according to claim 1, wherein the at least one processor configured to further perform the operations as:

a distance acquisition unit configured to acquire a distance from the apparatus to an object, and a detection unit configured to detect an in-focus area within an image acquired by the acquisition unit based on the acquired distance to the object, and wherein the combining map is calculated based on the detected in-focus areas of all acquired images whenever the acquisition unit acquires an image.

4. The apparatus according to claim 1, wherein the information on the combining map indicates a combining area in which the respective contrast value of all acquired images are not lower than a threshold value.

5. The apparatus according to claim 4, wherein the information on the combining map indicates number of times of having been selected as the combining area of pixels of all the acquired images.

6. The apparatus according to claim 5, wherein the acquisition unit assigns a different color to each pixel depending on whether or not the number of times of having been selected as the combining area is not smaller than a predetermined value.

7. The apparatus according to claim 5, wherein the information on the combining map further indicates a change in the number of times of having been selected as the combining area between the combined images generated whenever the acquisition unit acquires an image.

8. The apparatus according to claim 7, wherein in the combined image, the acquisition unit assigns a different color to each pixel depending on whether or not the number of times of having been selected as the combining area has changed.

9. A method of controlling an apparatus including an image capturing section configured to capture an image of an object, a lens configured to cause the image of the object to be formed on an image sensor, and an operation section configured to acquire photographing conditions including a focus movement amount and a number of images to be photographed from a user, the method comprising:

controlling the lens and the photographing unit to sequentially acquire images to be photographed the number of which is the acquired number, by discretely displacing a focal length by the acquired focus movement amount; and calculating, whenever acquiring one of the acquired number of images to be photographed, a combining map indicative of a combining ratio of respective pixels at same positions in all of the acquired images, generating a combined image based on all of the acquired images according to the combining map, and sequentially displaying the generated combined images by superimposing information on the combining map thereon.

10. The method according to claim 9, wherein the combining map is calculated based on contrast values of all acquired images whenever an image is acquired.

11. The method according to claim 9, further comprising:

acquiring a distance from the apparatus to an object; and detecting an in-focus area within an image based on the acquired distance to the object, wherein the combining map is calculated based on the detected in-focus areas of all acquired images whenever an image is acquired.

12. The method according to claim 9, wherein the information on the combining map indicates a combining area in which the respective contrast value of all acquired images are not lower than a threshold value.

13. The method according to claim 12, wherein the information on the combining map indicates number of times of having been selected as the combining area of pixels of all the acquired images.

14. The method according to claim 13, wherein the acquiring assigns a different color to each pixel depending on whether or not the number of times of having been selected as the combining area is not smaller than a predetermined value.

15. A non-transitory computer-readable storage medium storing a program for causing a computer to execute a method of controlling an apparatus including an image capturing section configured to capture an image of an object, a lens configured to cause the image of the object to be formed on an image sensor, and an operation section configured to acquire photographing conditions including a focus movement amount and a number of images to be photographed from a user, the method comprising:

controlling the lens and the photographing unit to sequentially acquire images to be photographed the number of which is the acquired number, by discretely displacing a focal length by the acquired focus movement amount; and calculating, whenever acquiring one of the acquired number of images to be photographed, a combining map indicative of a combining ratio of respective pixels at same positions in all of the acquired images, generating a combined image based on all of the acquired images according to the combining map, and sequentially displaying the generated combined images by superimposing information on the combining map thereon.

16. The non-transitory computer-readable storage medium according to claim 15, wherein the combining map is calculated based on contrast values of all acquired images whenever an image is acquired.

17. The non-transitory computer-readable storage medium according to claim 15, further comprising:

acquiring a distance from the apparatus to an object; and detecting an in-focus area within an image based on the acquired distance to the object, wherein the combining map is calculated based on the detected in-focus areas of all acquired images whenever an image is acquired.

18. The non-transitory computer-readable storage medium according to claim 15, wherein the information on the combining map indicates a combining area in which the respective contrast value of all acquired images re not lower than a threshold value.

19. The non-transitory computer-readable storage medium according to claim 18, wherein the information on the combining map indicates number of times of having been selected as the combining area of pixels of all the acquired images.

20. The non-transitory computer-readable storage medium according to claim 19, wherein the acquiring assigns a different color to each pixel depending on whether or not the number of times of having been selected as the combining area is not smaller than a predetermined value.

* * * * *